Patented Nov. 26, 1946

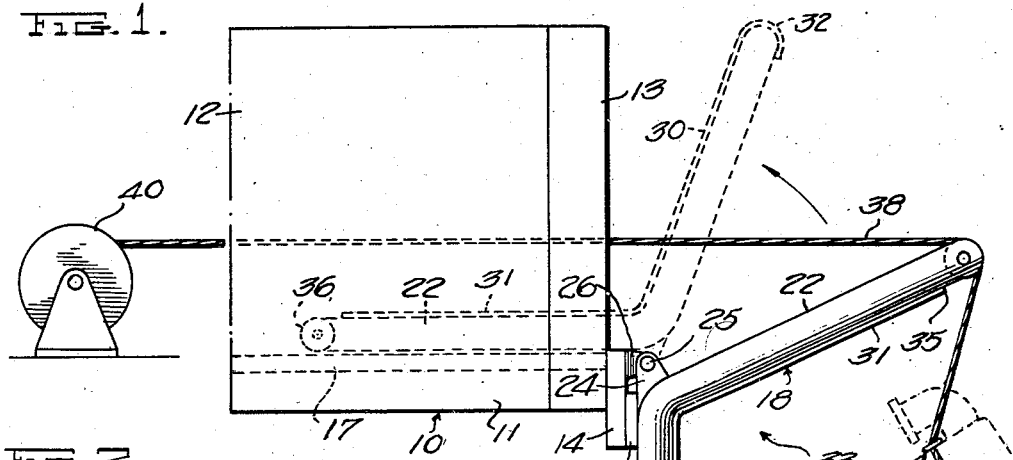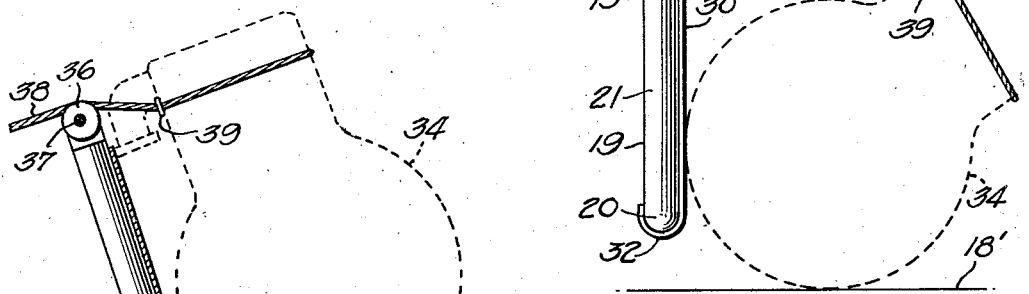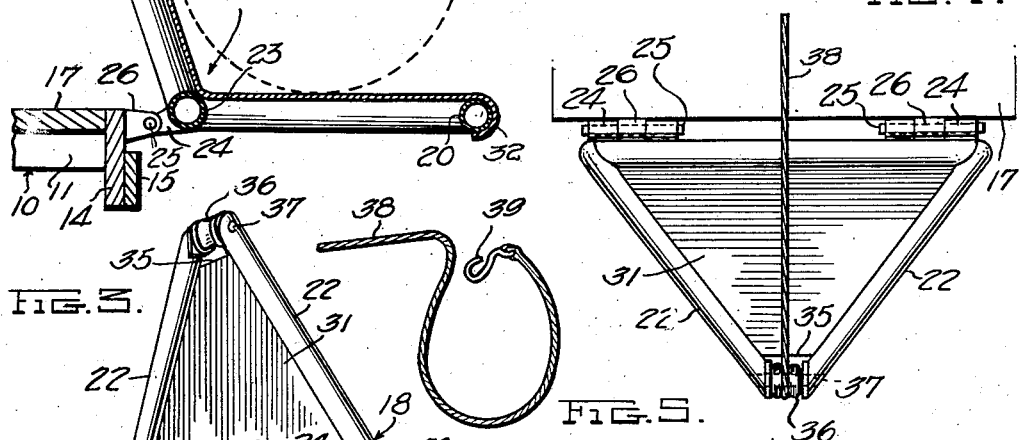

2,411,821

UNITED STATES PATENT OFFICE 2,411,821

LOADING DEVICE

Samuel C. Choat, North Bend, Oreg., assignor of one-tenth to Ben C. Flaxel, North Bend, Oreg.

Application February 1, 1945, Serial No. 575,655

7 Claims. (Cl. 214—77)

1

This invention relates to loading devices, and more particularly to a mechanism adapted to be connected to a truck or trailer body, or the like, for the transferring of heavy loads from the ground into the truck body.

An important object of the invention is to provide an extremely simplified form of device operable for transmitting a pulling force to a load to move it into loading position with respect to the device, whereupon the pulling force is transmitted to the device to move the latter in such manner as to elevate the load and swing it into the truck or other conveyance.

A further object is to provide such a device which is substantially unitary and of fixed shape and adapted to swing as a body from its outer pick-up position to its inner position in which the load is transferred to the truck body or the like.

A further object is to provide a simple form of loading device having sides angularly formed to provide a loading pocket, and to provide means for elevating the load from the ground into such pocket and to then automatically transfer the load-lifting force to the device to swing it and elevate the load and move it into the truck or other conveyance.

A further object is to provide such a device provided with a sheave around which passes a cable to transmit force to a load to lift and swing the latter into operative engagement with the device, whereupon the pulling force is transmitted through the load to the device to swing it upwardly and into the truck.

Other objects and advantages of the invention will become apparent during the course of the following description.

In the drawing I have shown one embodiment of the invention. In this showing,

Figure 1 is a fragmentary side elevation of the rear end of a truck or trailer body showing the invention applied, the loading winch being diagrammatically represented.

Figure 2 is a central vertical sectional view through the device and a portion of the rear end of the truck body, the device being shown in an intermediate position, Figure 3 is an under-side perspective view of the device showing it approximately in the same position as in Figure 2, Figure 4 is a plan view of the device shown in loading position as in solid lines in Figure 1, a portion of the truck body bed being illustrated, and Figure 5 is a fragmentary perspective view of

2 the working end portion of a pulling cable used in connection with the device.

Referring to Figure 1, the numeral 10 designates the rear end of a truck or trailer body or similar conveyance into which it is desired to convey relatively heavy loads. The truck includes the usual side frame members 11 and side boards 12 connected to standards 13. The truck body further includes a transverse rear structural member 14 to which is connected a preferably metal pressure plate 15 for a purpose to be described.

As shown in Figure 2, the truck or trailer 10 further includes a bed 17. The device forming the subject matter of the present invention is adapted to swing a load from the ground or surrounding surface 18' (Figure 1) upwardly and inwardly to a position supported by the bed 17. The device is indicated as a whole by the numeral 18 and comprises a rigid frame 19 which is preferably formed of steel pipe. One piece of such pipe may be bent to form a transverse base portion 20, parallel side arms 21 and converging arms 22, the latter being in a common plane arranged at an angle to the plane of the parallel arms 21, as shown in Figure 1. The pipe 19 is connected by a cross pipe 23 welded to the pipe 19 at the angle formed between the arms 21 and 22.

The cross member 23 has hinge elements 24 preferably welded thereto to receive hinge pins 25 extending through hinge elements 26 carried by the frame member 14. Thus the device 18 is mounted to swing on a horizontal axis from the solid line position to the dotted line position in Figure 1. Plates 30 and 31 are arranged against the respective arms 21 and 22, and these plates may be formed of relatively rigid steel and of a unitary piece as shown in Figure 1, if desired. The end of the plate 30 remote from the pivot axis may be turned about the cross pipe 20 as indicated by the numeral 32. The angle within the plates 30 and 31 forms a pocket 33 for the reception of the load to be transported, shown in the present instance, for example, as a vehicle engine 34.

The plate 31 terminates short of the converging ends of the arms 22, as at 35. Such ends of the arms 22 are spaced from each other and a sheave 36 is mounted therebetween and rotatably supported on a suitable shaft 37. A cable 38 passes around the sheave 36 and has its load-engaging end preferably provided with a hook 39 (Figure 5). The other end of the cable 38 is connected to a suitable winch diagrammatically indicated by the numeral 40 and of any desired type. It will be apparent that the arms 21 bear against the pressure plate 15 when the device is in the loading position shown in Figure 1. Under such conditions, a pull transmitted through the cable 38 will swing the load 34 upwardly into a position to be engaged by the plates 30 and 31.

The operation of the device is as follows:

The truck or other conveyance normally travels with the device in the dotted line position shown in Figure 1. When it is desired to load a heavy object on the truck, the winch 40 is operated to slack off the cable 38 and the device 18 is turned in a clockwise direction to the solid line position shown in Figure 1. The truck is then backed into proximity to the load, whereupon the hook is pulled to unwind it as far as necessary from the winch. The load-engaging end of the cable is then passed beneath a suitable point with respect to the load and the hook is pulled around the load and engaged with the body of the cable as shown in Figure 1.

The winch is now operated to transmit a pull to the cable 38 and this pull is directly transmitted to the load, as will be obvious, the device 18 being prevented from turning in a clockwise direction by engagement with the pressure plate 15. The latter element extends a sufficient distance from the pivot 25 to withstand the load which will be transmitted to it. The transmission of a pull to the load will effect whatever movement is necessary to properly position it with respect to the present device. For example, in the case of a vehicle engine, the cable will be passed around the cylinders with the crank case in a position to engage the plate 30. An upward pull transmitted through the cable 38 to the engine will swing the latter upwardly as indicated in Figure 1, and this movement will continue until the load engages the plates 30 and 31 so that it is prevented from moving further. Thereafter, the pulling force transmitted through the cable 38 will effect turning movement of the device 18 in a counterclockwise direction, the pull being transmitted through the load and thence to the entire device 18 through the plate 31.

The operation referred to swings the device 18 in a counter-clockwise direction about the shafts 25 and in so doing, the load 34, which will be arranged in the angle or pocket 33, will be elevated and moved inwardly relative to the truck. The operation referred to will be continued until the arms 22 assume the horizontal position shown in dotted lines in Figure 1, at which time the load will be supported by the bed of the truck. The weight of the article will retain the device 18 in such position, whereupon the load may be transported to any desired point.

It will be obvious that the winch 40, in actual practice, will be arranged in the forward portion of the body of the truck and accordingly remote from the rear end thereof. In the event more than one load is to be transported, the operator may continue the winding action of the winch after the device reaches the dotted line position shown in Figure 1, and the load will be pulled forwardly from the plate 31 on to the bed of the truck. The load may be pulled as far forwardly as desired or practicable, and the loading device will be free to be moved back to the solid line position in Figure 1 for the picking up of another article or load.

It will be apparent that the frame and other elements of the device may be formed of any suitable material, it being unnecessary to employ pipe sections for making the frame or a single plate sheet for making the bed of the device 18. The most important feature of the construction lies in its simplicity and the fact that the device is substantially unitary and movable bodily to elevate and swing the load into position on the bed of a truck or trailer simply by exerting a suitable pull on a single cable which both moves the load into engagement with the device and swings the latter, together with the load, upwardly and inwardly to the loaded position.

While the device has been particularly described in connection with the loading of articles on to a truck or trailer body, it obviously is not limited to such use and the truck bed 17 may be construed merely as an elevated platform to which an article is to be moved from an adjacent lower surface.

I claim:

1. A device for elevating a load to a platform or the like comprising a body horizontally angled intermediate its ends to form a load-receiving pocket, means for supporting said body adjacent the angle therein for swinging movement on a horizontal axis adjacent one end of said platform, said body being adapted to assume an initial position with one end of said body extending downwardly from said turning axis with the other end of said body extending generally away from said end of the platform, and a cable adapted to pass over the second named end of said body at a point remote from said pivot axis and then downwardly around a load for connection therewith whereby a pulling force on said cable when said body is in said position will move the load relative to said body into said pocket and thereafter swing said body to move the second named end thereof into a position directly over said platform.

2. A device for elevating a load to a platform or the like comprising a body horizontally angled intermediate its ends to form a load-receiving pocket, means for supporting said body adjacent the angle therein for swinging movement on a horizontal axis adjacent one end of said platform, said body being adapted to assume an initial position with one end of said body extending downwardly from said turning axis with the other end of said body extending generally away from said end of the platform, a sheave carried by the second named end of said body remote from said pivot axis, and a cable having one end connectable with a load and extending over said sheave, whereby a pull on the other end of said cable, with said body in said initial position, will move the load into said pocket and thereafter transmit to said body, through the load, a force to swing said body to a second position with the load over the platform.

3. A device for elevating a load to a platform or the like comprising a body horizontally angled intermediate its ends to form a load-receiving pocket, means for supporting said body for swinging movement on a horizontal axis adjacent one end of said platform, said body adjacent the angle therein being adapted to assume an initial position with one end of said body extending downwardly from said turning axis with the other end of said body extending generally away from said end of the platform, a sheave carried by the second named end of said body for turning movement on an axis remote from said pivot axis, and a cable passing around said sheave and having one end connectable with a load whereby a pulling force on the other end of said cable will move the load with respect to said body into said pocket whereupon a force will be transmitted to said body to effect turning movement thereof until the second named end of said body assumes a position directly over said platform.

4. A device for elevating a load to a platform or the like comprising a frame structure having two portions arranged at an angle with respect to each other with such angle substantially horizontally arranged, plate sections fixed to said frame structure at the inside of the angle therein to form an article receiving pocket, said frame structure and said plate means forming a composite rigid structure, means for supporting such rigid structure for turning movement on a horizontal axis adjacent said angle, said rigid structure being adapted to assume a position wherein one end thereof extends downwardly and the other end extends away from said end of the platform, and cable means passing over the extremity of the second named end of said rigid structure and connectable with the load whereby a pulling force on said cable will move the load to a position in said pocket and thereafter turn said rigid structure to move the load into a position over said platform.

5. A device for elevating a load to a platform or the like comprising a frame structure having two portions arranged at an angle with respect to each other with such angle substantially horizontally arranged, plate sections fixed to said frame structure at the inside of the angle therein to form an article receiving pocket, said frame structure and said plate means forming a composite rigid structure, means for supporting such rigid structure for turning movement on a horizontal axis adjacent said angle, said rigid structure being adapted to assume a position wherein one end thereof extends downwardly and the other end extends away from said end of the platform, and a sheave carried by the second named end of said rigid structure on a horizontal axis remote from said pivot axis, and a cable passing over said sheave and having one end provided with a hook whereby such end of the cable may be passed around the load and the hook engaged with the body of the cable, whereupon a pulling force transmitted to the other end of said cable will move the load relative to said rigid structure into said pocket and then effect turning movement of said rigid structure to move the load to a position over said platform.

6. In combination with an elevated platform, horizontal pivot means carried by said platform adjacent one end thereof, a rigid loading device horizontally angled intermediate its ends adjacent said pivot means and connected thereto, said loading device being adapted to assume a position with one end extending downwardly from said pivot means with its other end extending generally away from said end of the platform, means carried by said platform for limiting turning movement of said loading device in one direction beyond such position, and means for transmitting a force to a load to move it into position in contact with said device and to then swing said device to move the second named end thereof into position over said platform.

7. In combination with an elevated platform, horizontal pivot means carried by said platform adjacent one end thereof, a rigid loading device horizontally angled intermediate its ends adjacent said pivot means and connected thereto, said loading device being adapted to assume a position with one end extending downwardly from said pivot means with its other end extending generally away from said end of the platform, means carried by said platform for limiting turning movement of said loading device in one direction beyond such position, a sheave carried by the second named end of said device remote from said pivot means, and a cable extending around said sheave and having one end connectable to a load whereby a pulling force on the other end of said cable will effect movement of the load into engagement with said device and thereafter turn said device about said pivot means to swing the second named end of said device to a position over and in engagement with said platform.

SAMUEL C. CHOAT.